United States Patent
Sidelkovskiy

(10) Patent No.: US 9,611,788 B2
(45) Date of Patent: Apr. 4, 2017

(54) MULTI-SHAFT GAS TURBINE ENGINE

(71) Applicant: Rolls-Royce Corporation, Indianapolis, IN (US)

(72) Inventor: Dmitriy B. Sidelkovskiy, Ellington, CT (US)

(73) Assignee: Rolls-Royce Corporation, Indianapolis, IN (US)

( * ) Notice: Subject to any disclaimer, the term of this patent is extended or adjusted under 35 U.S.C. 154(b) by 560 days.

(21) Appl. No.: 14/140,964

(22) Filed: Dec. 26, 2013

(65) Prior Publication Data

US 2014/0250860 A1    Sep. 11, 2014

Related U.S. Application Data

(60) Provisional application No. 61/774,537, filed on Mar. 7, 2013.

(51) Int. Cl.
*F02C 3/107* (2006.01)
*F02C 7/36* (2006.01)

(52) U.S. Cl.
CPC .............. *F02C 7/36* (2013.01); *F02C 3/107* (2013.01); *F05D 2260/4031* (2013.01)

(58) Field of Classification Search
CPC .. F02C 5/107; F02C 7/36; F01D 15/12; F05D 2260/4031
See application file for complete search history.

(56) References Cited

U.S. PATENT DOCUMENTS

| | | | |
|---|---|---|---|
| 4,916,894 A | 4/1990 | Adamson et al. | |
| 5,010,729 A * | 4/1991 | Adamson | F02C 3/067 416/129 |
| 6,082,967 A * | 7/2000 | Loisy | F02C 3/113 415/68 |
| 7,185,496 B2 | 3/2007 | Herlihy | |
| 7,363,757 B2 * | 4/2008 | Loisy | F02C 3/113 60/226.1 |
| 7,726,113 B2 | 6/2010 | Orlando et al. | |
| 7,882,693 B2 | 2/2011 | Schilling | |
| 7,905,083 B2 | 3/2011 | Orlando et al. | |
| 8,015,798 B2 | 9/2011 | Norris et al. | |

(Continued)

FOREIGN PATENT DOCUMENTS

| | | |
|---|---|---|
| EP | 0867607 A1 | 9/1998 |
| EP | 2071153 A2 | 6/2009 |

OTHER PUBLICATIONS

International Search Report and Written Opinion, International Application No. PCT/US2013/076523, search completed May 14, 2014, 9 pages.

(Continued)

*Primary Examiner* — Arun Goyal

(74) *Attorney, Agent, or Firm* — Barnes & Thornburg LLP

(57) ABSTRACT

A gas turbine engine is disclosed with a first spool having a first turbine connected to a first compressor through a first rotatable shaft; a second spool having a second turbine connected to a second compressor through a second rotatable shaft; and a gearbox having a power input port coupled to each of the first and second shafts and a power output port connected to a third shaft, wherein the rotational speed of the third shaft is lower than the rotational speed of each of the first and second shafts.

7 Claims, 5 Drawing Sheets

(56) References Cited

U.S. PATENT DOCUMENTS

2015/0354502 A1* 12/2015 Kuhne ..................... F02K 3/06
          60/226.1
2016/0138477 A1*  5/2016 Otto ........................ F02C 3/10
          415/122.1
2016/0195096 A1*  7/2016 Otto ........................ F02K 3/06
          415/1

OTHER PUBLICATIONS

International Search Report and Written Opinion issued to International Patent Application No. PCT/US2013/076523, mailed May 19, 2014, 10 pages.

* cited by examiner

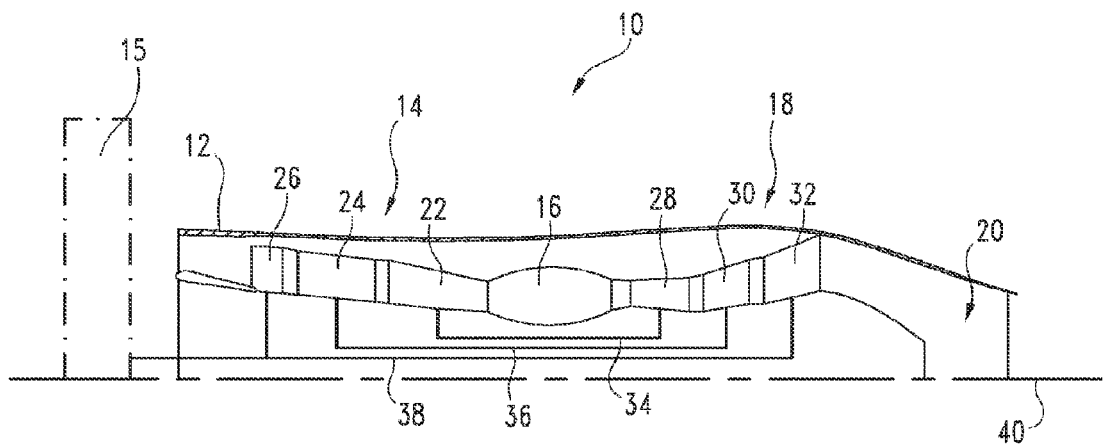
Fig. 1 *(Prior Art)*
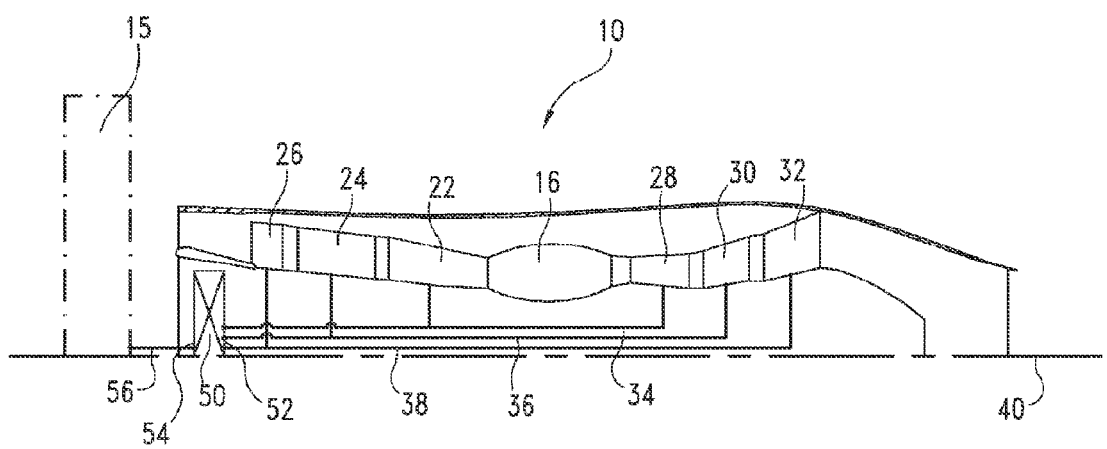
Fig. 2

MULTI-SHAFT GAS TURBINE ENGINE

CROSS-REFERENCE TO RELATED APPLICATIONS

This application claims priority to U.S. Provisional Application Ser. No. 61/774,537, entitled "Multi-Shaft Gas Turbine Engine," filed Mar. 7, 2013, which is incorporated herein by reference in its entirety.

FIELD OF THE INVENTION

The present invention relates to a multi-shaft gas turbine engine, and more particularly to a multi-shaft gas turbine engine having two or more turbines coupled to at least one gearbox to improve the efficiency of one or more power devices coupled thereto.

BACKGROUND

Gas turbine engine designers continuously work to improve engine efficiency, to reduce operating costs of the engine, and to reduce specific exhaust gas emissions such as NOx, CO2, CO, unburned hydrocarbons, and particulate matter. The specific fuel consumption (SFC) of an engine is inversely proportional to the overall thermal efficiency of the engine, thus, as the SFC decreases the fuel efficiency of the engine increases. Furthermore, specific exhaust gas emissions typically decrease as the engine becomes more efficient. The thermal efficiency of the engine is a function of component efficiencies, cycle pressure ratio and turbine inlet temperature. Component efficiencies of power devices such as fans, turboprops, electric generators and the like are a function of their rotational speed at a particular operating condition of the gas turbine engine. Gas turbine power systems remain an area of interest. Some existing gas turbine power systems have various shortcomings, drawbacks, and disadvantages relative to certain applications. Accordingly, there remains a need for further contributions in this area of technology.

SUMMARY

One embodiment of the present invention is a unique gas turbine engine propulsion system. Another embodiment includes a gas turbine engine power system having a gearbox for driving a power device. Other embodiments include unique apparatuses, systems, devices, hardware, methods, and combinations for gas turbine engine power systems. Further embodiments, forms, features, aspects, benefits, and advantages of the present application shall become apparent from the following description and drawings.

BRIEF DESCRIPTION OF THE DRAWINGS

The description herein makes reference to the accompanying drawings wherein like reference numerals refer to like parts throughout the several views, and wherein:

FIG. 1 is a schematic cross-sectional view of a conventional multi-spool gas turbine engine;

FIG. 2 is a schematic cross-sectional view of a multi-spool gas turbine engine according to one embodiment of the present disclosure;

DETAILED DESCRIPTION

Figure 3:
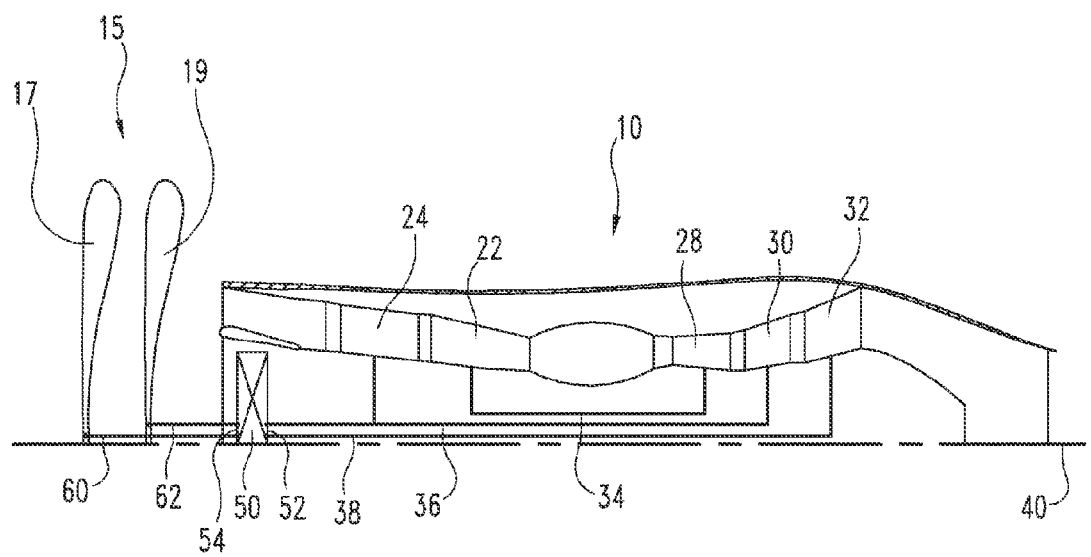
FIG. 3 is a schematic cross-sectional view of a multi-spool gas turbine engine according to another embodiment of the present disclosure.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, a schematic view of a conventional multi-shaft gas turbine engine 10 is depicted. While the gas turbine engine 10 is illustrated with three spools (i.e. one shaft connecting a turbine and a compressor for each of the high pressure, intermediate pressure and low pressure stages), it should be understood that the present disclosure is not limited to a three spool engine configuration and as such may be used in two spool engines for both thrust producing and power generation configurations such as electric generation and fluid pumping applications. It should also be understood that the present disclosure contemplates any engine configuration having a gearbox and power device. The gas turbine engine 10 will be described generally, however significant details regarding general gas turbine engine function and operation will not be presented herein as it is believed that the theory of operation and general parameters of gas turbine engines are well known to those of ordinary skill in the art. It should be understood that any form of gas turbine engine is contemplated by the present disclosure, including those engines with variable geometry turbomachinery, variable exhaust nozzles, and other movable structure.

The gas turbine engine 10 includes an inlet section 12, a compressor section 14, a combustor section 16, a turbine section 18, and an exhaust section 20. In operation, air is drawn in through the inlet 12 which can include a fan inlet for a turbofan engine and a compressor inlet and compressed to a high pressure relative to ambient pressure in the compressor section 14. The air is mixed with fuel in the combustor section 16 wherein the fuel/air mixture burns and produces a high temperature and high pressure working fluid from which the turbine section 18 extracts power. The turbine section 18 is mechanically coupled to the compressor section 14 and can also be coupled to a power device 15. The power device 15 can include a fan for a bypass turbofan engine, a propeller for a turboprop engine, an electric generator, a compressor, and a pump or the like. In this configuration a compressor section 14 includes a high pressure compressor 22, an intermediate compressor 24, and a low pressure compressor 26 driven by a high pressure turbine 28, an intermediate turbine 30, and a low pressure turbine 32, respectively. A high pressure shaft 34, an intermediate pressure shaft 36, and a low pressure shaft 38 mechanically connect the respective turbine and compressor sections. The shafts 34, 36, 38 rotate about a centerline axis 40 that extends axially along the longitudinal axis of the engine 10, such that as the turbine section 18 rotates due to the forces generated by the high pressure working fluid, the compressor section 14 is rotatingly driven by the turbine section 18 to produce compressed air. A portion of the power extracted from the turbine section 18 can be utilized to drive the power device 15.

The present disclosure provides for a gas turbine engine in various forms having at least two turbines coupled to one or more gearboxes to provide power thereto. When the term "gearbox" is used in this disclosure it should be understood that it is used generically as a device to increase torque output while reducing the rotational speed of one or more output shafts relative to one or more prime mover input shafts. The one or more output shafts of a gearbox can rotate at a slower rate than the input shafts, and this reduction in speed will produce a mechanical advantage causing an increase in torque. A particular type of gearbox or design of gearbox is not required for implementation of this disclosure. The gearbox may include hydraulic means, electric means, one or more clutches, transmission means to control variable gear ratios and other features useful for an operationally viable gearbox that can be coupled to a gas turbine engine. Also, it should be noted that the terms "connect" and "couple" can be used interchangeably to describe means for mechanical driving and/or causing movement by and between shafts, gears, gearboxes, turbomachinery (including turbines and compressors) and other power devices. A controller, not shown in the drawings, can be used to control the output speeds and torque levels of the gearbox output shafts as would be known by one skilled in the art.

One or more gearboxes can be positioned in the gas turbine engine to improve component efficiencies of the turbomachinery (i.e. compressors and turbines) and a power device. The efficiency improvement comes through control of rotational speeds of the turbomachinery and power devices such that individual turbines, compressors and power devices operate as close as possible to ideal design efficiency across an operating region of the gas turbine engine. Each gearbox can be operable for receiving power from one or more turbines and transmitting that power to a power device. In general a power device will operate at a higher efficiency when running at a different rotational speed than that of the turbines providing power to the power device. The power device can include, but is not limited to one or more turbofans, turboprops, electric generators, motor-generators, pusher props, unducted fans and the like. Each gearbox can include a power input port constructed to receive one or more input shafts from corresponding one or more turbines and/or power from the output of another gearbox. Each gearbox can also include a power output port that can be connected to one or more output shafts for delivering power to a power device and/or another gearbox. Each gearbox operates to transmit power from relatively high-speed input shaft(s) to one or more output shafts at a reduced speed through a gear reduction system.

In one form, a gearbox can be configured to transmit power directly from one turbine to one or more power devices through gear means operable for independently controlling the output torques and rotational speeds of the one or more output shafts. In another form, a gearbox can be coupled to a plurality of turbines such that the power from the turbines can be combined and then separated and transmitted to independent power devices through gear means operable for delivering a torque output and a speed output as desired to each independently controlled output shaft. In another form, a gearbox can be configured as a "pass through" gearbox wherein a plurality of power input shafts are connected to independent gear trains within the gearbox such that each power output shaft is independently and directly connected to one corresponding power input shaft.

Referring now to FIG. 2, a gearbox 50 is positioned in the gas turbine engine 10. The gearbox 50 can include a power input port 52 and a power outlet port 54. The power input port 52 is constructed to receive one or more input shafts to deliver power from one or more turbines of the gas turbine engine 10. The power outlet port 54 is constructed to couple one or more output shafts 56 to one or more power devices 15. Power devices 15 can include, but are not limited to turbofans, turboprops, electric generators, motor-generators, pusher props, and unducted fans. A low pressure turbine 32 can be coupled to a low pressure compressor 26 through a low pressure rotatable shaft 38. The low pressure turbine 32 can also be coupled to the power input port 52 of the gearbox 50 such that power in excess of that required to drive the low pressure compressor 26 can be delivered to the gearbox 50. An intermediate pressure turbine 30 can be coupled to an intermediate pressure compressor 24 through an intermediate pressure rotatable shaft 36. The intermediate pressure turbine 30 can also be coupled to the power input port 52 of the gearbox 50 such that power in excess of that required to drive the intermediate pressure compressor 24 can be delivered to the gearbox 50. A high pressure turbine 28 can be coupled to a high pressure compressor 22 through a rotatable shaft 34. The high pressure turbine 28 can also be coupled to the power input port 52 of the gearbox 50 such that power in excess of that required to drive the high pressure compressor 22 can be delivered to the gearbox 50.

The gearbox 50 can be constructed to receive power from each independent shaft through a power inlet port 52. In one aspect of this disclosure, it is contemplated that some operating conditions of the gas turbine engine may require all of the power from one or more of the turbines 28, 30, 32 to be delivered to their respective one or more compressors 22, 24, 26 such that power input into the gearbox 50 comes from less than all of the turbines coupled to the gearbox 50. In this form, the gearbox 50 can receive and combine the power from each of the three shafts 34, 36, 38 and transmit the power through gear means to the output shaft 56. The output shaft 56 couples the power device 15 to the gearbox 50 through the power output port 54. The power output shaft 56 can be controlled by a gearbox controller (not shown) to drive the power device 15 to as close to peak efficiency as possible. In this manner, power is transmitted to the power device 15 such that thrust, fluid compression and/or electrical power may be generated with the power device 15 at a high efficiency. In this exemplary configuration the gearbox 50 is positioned axially forward of the compressor section 14, but it should be understood that the gearbox 50 can be positioned in any desired location and still fall under the teachings of this disclosure.

Referring now to FIG. 3, another embodiment of the gas turbine engine 10 is shown. In this configuration, the gas turbine engine 10 includes a high pressure turbine 28 coupled to a high pressure compressor 22 through a high pressure shaft 34. An intermediate turbine 30 can be coupled to both an intermediate compressor 24 and a power input port 52 of a gearbox 50. A low pressure turbine 32 can be coupled to the power input port 52 of the gearbox 50. A power output port 54 of the gearbox 50 can be coupled to a power device 15 through two power output shafts 60 and 62. In this example, by way of illustration and not limitation, the power device 15 includes a forward propeller 17 and an aft propeller 19. The forward propeller 17 can be driven by the low pressure turbine 32 through the gearbox 50 and the aft propeller 19 can be driven by power from the intermediate turbine 30 through the gearbox 50. In this exemplary configuration the gearbox 50 is positioned axially forward of the compressor section 14 and the power device 15 is in the form of a pair of propellers, but it should be understood that the gearbox 50 can be positioned in any desired location and the power device 15 can be in other forms and still fall under the teachings of this disclosure.

Figure 4:
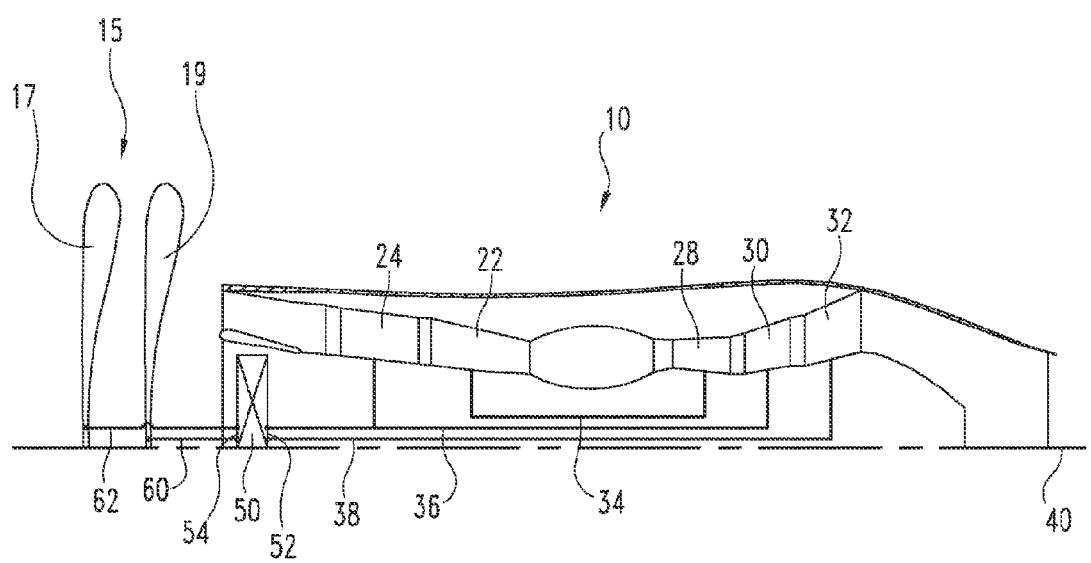
FIG. 4 is a schematic cross-sectional view of a multi-spool gas turbine engine according to another embodiment of the present disclosure.

Referring now to FIG. 4, yet another embodiment of the gas turbine engine 10 is shown. In this configuration the gas turbine engine 10 includes a high pressure turbine 28 coupled to a high pressure compressor 22 through a high pressure shaft 34. An intermediate turbine 30 can be coupled to both an intermediate compressor 24 and a power input port 52 of a gearbox 50 through an intermediate shaft 36. A low pressure turbine 32 can be coupled to a power input port 52 of the gearbox 50. The power input port 52 of the gearbox 50 can be coupled to two independent turbines 30, 32 through the intermediate and low pressure shafts 36, 38 respectively. The power output port 54 of the gearbox 50 can be coupled to a power device 15 through two output shafts 60 and 62. In this example, by way of illustration and not limitation, the power device 15 includes a forward propeller 17 and an aft propeller 19. The forward propeller 17 can be driven by power from the intermediate turbine 32 through the gearbox 50 and the aft propeller 19 can be driven by power from the low pressure turbine 32 through the gearbox 50. In this exemplary configuration the gearbox is positioned forward of the compressor section 14 and the power device 15 is in the form of a forward propeller 15 and an aft propeller 19, but it should be understood that the gearbox 50 can be positioned in any desired location and the power device 15 can be in other forms and still fall under the teachings of this disclosure.

Figure 5:
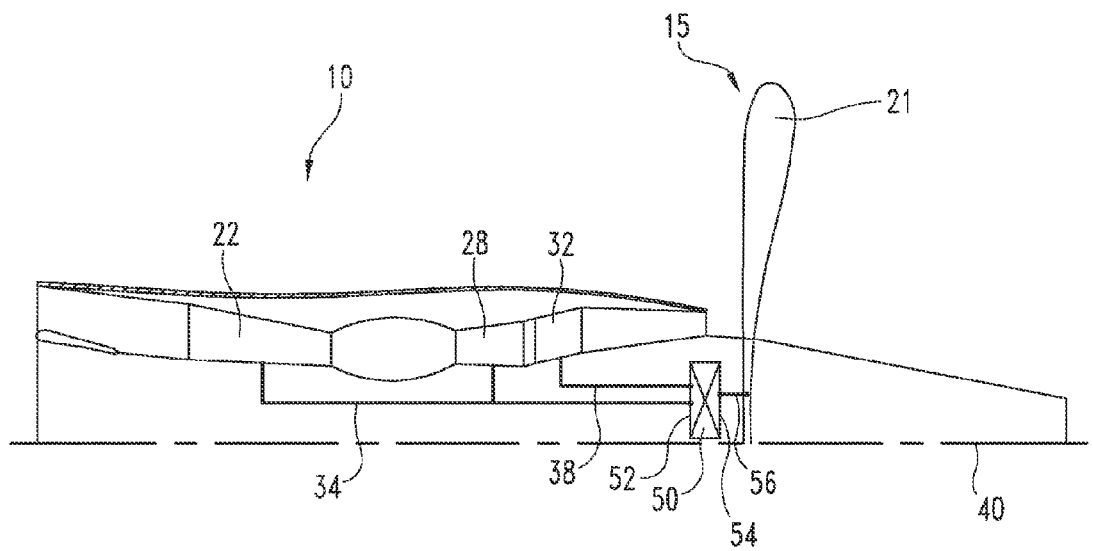
FIG. 5 is a schematic cross-sectional view of a multi-spool gas turbine engine according to another embodiment of the present disclosure.

Referring now to FIG. 5, yet another embodiment of the gas turbine engine 10 is shown. In this configuration the gas turbine engine 10 includes a high pressure turbine 28 coupled to a high pressure compressor 22 through a high pressure shaft 34. The high pressure turbine 28 can also be coupled to a power input port 52 of a gearbox 50 through the high pressure shaft 34. A low pressure turbine 32 can be coupled directly to the power input port 52 of the gearbox 50 through a low pressure shaft 38. Power from the low pressure turbine shaft 38 and the high pressure turbine shaft 34 is delivered to the gearbox 50 and transmitted to a power device 15 through an output shaft 56 coupled to a power outlet port 54 of the gearbox 50. In this exemplary configuration the gearbox 50 is positioned aft of the turbine section 18 and the power device 15 is in the form of a pusher propeller 21, but it should be understood that the gearbox 50 can be positioned in any desired location and the power device 15 can be in other forms and still fall under the teachings of this disclosure.

Figure 6:
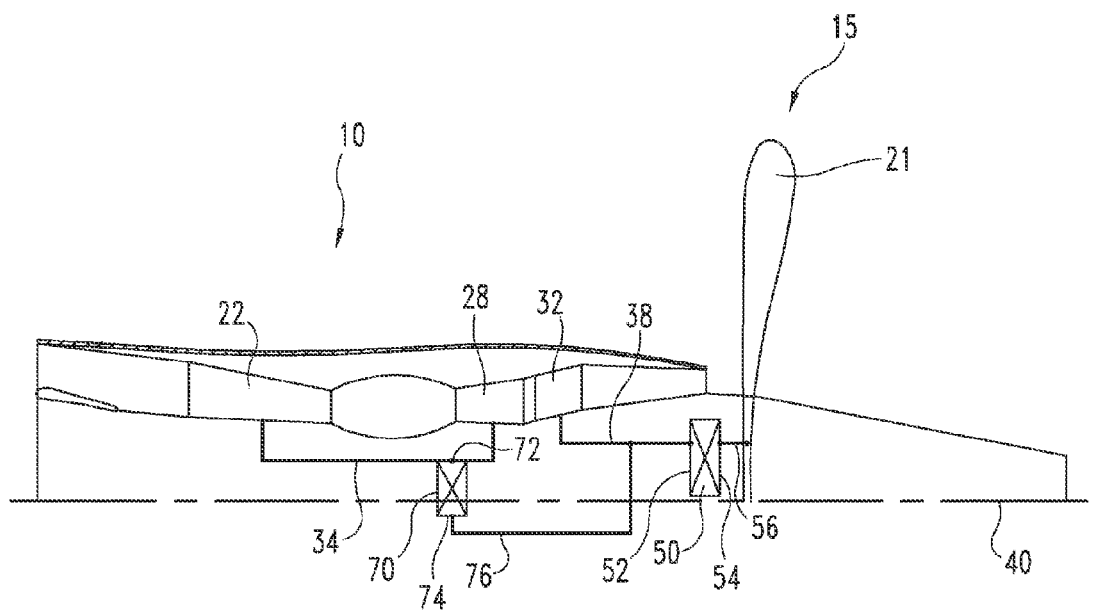
FIG. 6 is a schematic cross-sectional view of a multi-spool gas turbine engine according to another embodiment of the present disclosure.

Referring now to FIG. 6, yet another embodiment the gas turbine engine 10 is shown. In this configuration, the gas turbine engine 10 includes a high pressure turbine 28 coupled to a high pressure compressor 22 through a high pressure shaft 34. The high pressure turbine 28 can also be coupled to a power input port 72 of a second gearbox 70 through the high pressure shaft 34. A low pressure turbine 32 can be coupled to a power input port 52 of a first gearbox 50 through a low pressure shaft 38. An output shaft 76 of the second gearbox 70 can be coupled to the low pressure shaft 38 such that power from the output shaft 76 of the second gearbox 70 can be combined with the power output of the low pressure turbine 38 and delivered to the first gearbox 50. The combined power of the low pressure turbine 32 and the output of the second gearbox 70 can be transmitted through the first gear box 50 to the power output port 54 of the first gearbox 50. An output shaft 56 can be coupled to the power output port 54 of the first gearbox 50 to drive a power device 15. In this exemplary configuration the first gearbox 50 is positioned aft of the turbine section 18, the second gearbox 70 is positioned axially forward of the first gearbox 50 and the power device 15 is in the form of a pusher propeller 21, but it should be understood that the first gearbox 50 and the second gearbox 70 can be positioned in any desired location and the power device 15 can be in other forms and still fall under the teachings of this disclosure.

Figure 7:
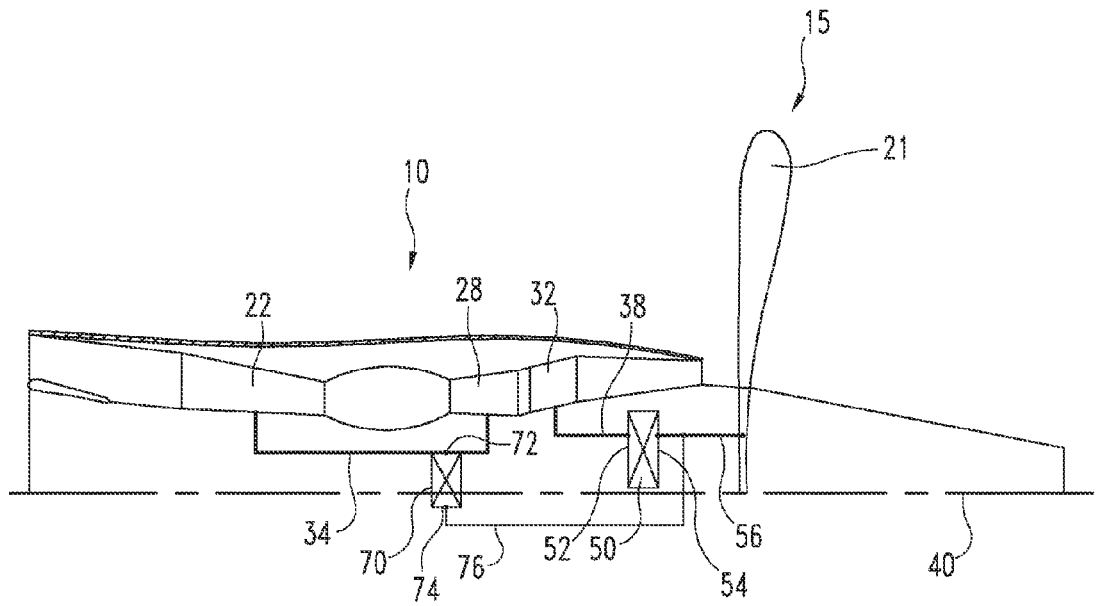
FIG. 7 is a schematic cross-sectional view of a multi-spool gas turbine engine according to another embodiment of the present disclosure.

Referring now to FIG. 7, yet another embodiment of the gas turbine engine 10 is shown. In this configuration, the gas turbine engine 10 includes a high pressure turbine 28 coupled to a high pressure compressor 22 through a high pressure shaft 34. The high pressure turbine 28 can also be coupled to a power input port 72 of a second gearbox 70 through the high pressure shaft 34. A low pressure turbine can be coupled to a power input port 52 of a first gearbox 50 through a low pressure shaft 38. A power output shaft 56 can be coupled to a power output port 54 of the first gearbox 50. A power output shaft 76 of the second gearbox 70 can be coupled from the power outlet port 74 to the output shaft 56 of the first gearbox 50 such that power from the output shaft 76 of the second gearbox 70 can be combined with the power output of the first gearbox 50. The combined power output of the first and second gearboxes 50, 70 can be transmitted through the output shaft 56 of the first gearbox 50 to drive the power device 15. In this exemplary configuration the first gearbox 50 is positioned aft of the turbine section 18, the second gearbox 70 is positioned axially forward of the first gearbox 50 and the power device 15 is in the form of a pusher propeller 21, but it should be understood that the first gearbox 50 and the second gearbox 70 can be positioned in any desired location and the power device 15 can be in other forms and still fall under the teachings of this disclosure.

Figure 8:
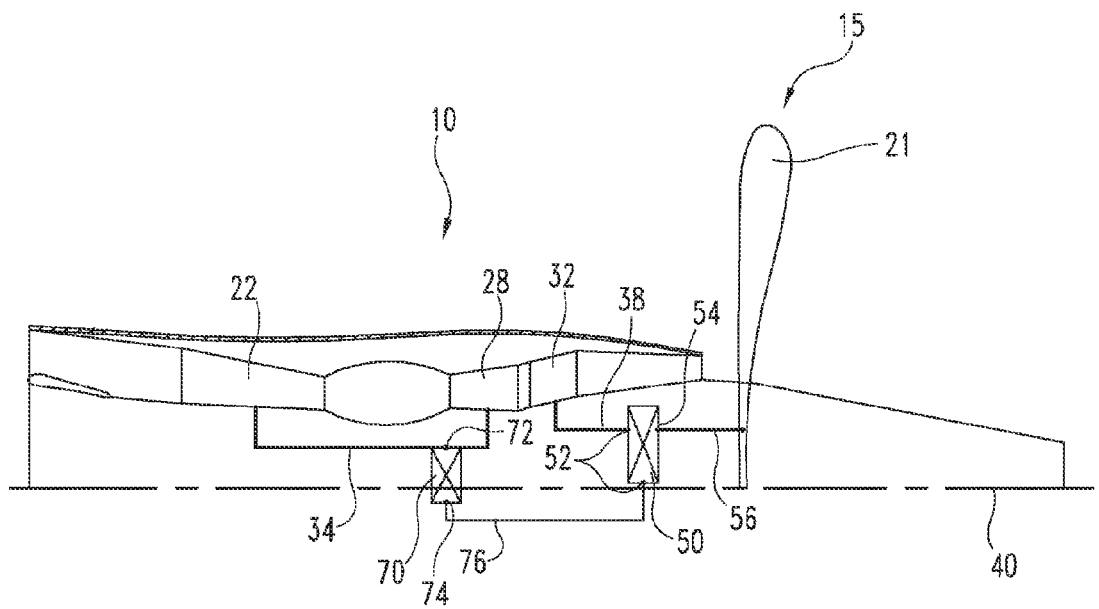
FIG. 8 is a schematic cross-sectional view of a multi-spool gas turbine engine according to another embodiment of the present disclosure.

Referring now to FIG. 8, yet another embodiment of the gas turbine engine 10 is shown. In this configuration, the gas turbine engine 10 includes a high pressure turbine 28 coupled to a high pressure compressor 22 through a high pressure shaft 34. The high pressure turbine 28 is also coupled to a power input port 72 of a second gearbox 70 through the high pressure shaft 34. A low pressure turbine 32 can be coupled to a power input port 52 of a first gearbox 50 to provide power thereto. An output shaft 76 can be coupled from an output port 74 of the second gearbox 70 to a power input port 52 of a first gearbox 50 such that power from the output shaft 76 of the second gearbox 70 can be combined with the power input from the low pressure turbine 32. The combined power of the low pressure turbine 32 and the output of the second gearbox 70 can be transmitted to a power device 15 through an output shaft 56 coupled to a power output port 54 of the second gearbox 50. In this exemplary configuration the first gearbox 50 is positioned aft of the turbine section 18, the second gearbox 70 is positioned axially forward of the first gearbox 50 and the power device 15 is in the form of a pusher propeller 21, but it should be understood that the first gearbox 50 and the second gearbox 70 can be positioned in any desired location and the power device 15 can be in other forms and still fall under the teachings of this disclosure.

Figure 9:
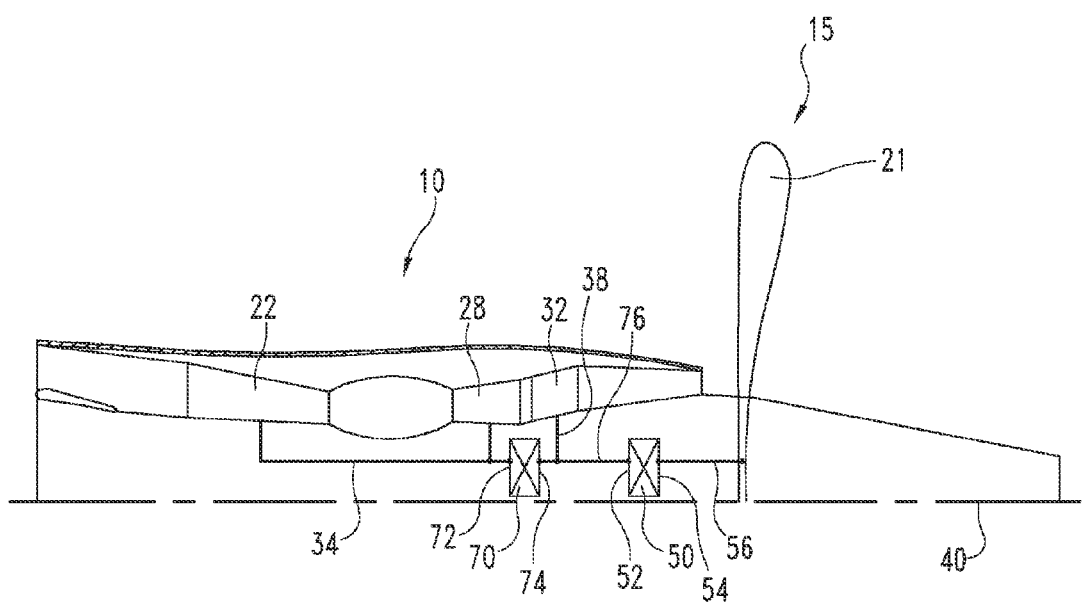
FIG. 9 is a schematic cross-sectional view of a multi-spool gas turbine engine according to another embodiment of the present disclosure.

Referring now to FIG. 9, yet another embodiment of the gas turbine engine 10 is shown. In this configuration, the gas turbine engine 10 includes a high pressure turbine 28 coupled to a high pressure compressor 22 through a high pressure shaft 34. The high pressure turbine 28 is also coupled to a power input port 72 of a second gearbox 70 through the high pressure shaft 34. An output shaft 76 of the second gearbox 70 can be coupled to a power output port 74 of the second gearbox 70. A low pressure turbine 32 can be coupled to the output shaft 76 of the second gearbox 70 through a low pressure shaft 38. The output shaft 76 carries power from the second gearbox 70 and the low pressure turbine 32 to a power input port 52 of first gearbox 50. The combined power of the low pressure turbine 32 and the second gearbox 70 can be transmitted through the first gearbox 50 to drive a power device 15 through an output shaft 56 coupled to a power output port 54 of the second gearbox 50. In this exemplary configuration the first gearbox 50 is positioned aft of the turbine section 18, the second gearbox 70 is positioned axially forward of the first gearbox 50 and the power device 15 is in the form of a pusher propeller 21, but it should be understood that the first gearbox 50 and the second gearbox 70 can be positioned in any desired location and the power device 15 can be in other forms and still fall under the teachings of this disclosure.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and embodiment lacking the same may be contemplated as within the scope of the invention, that scope being defined by the claims that follow. In reading the claims it is intended that the words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine comprising:
    a first spool having a first turbine connected to a first compressor through a first rotatable shaft;
    a second spool having a second turbine connected to a second compressor through a second rotatable shaft;
    a first gearbox having a first power input port coupled to the first rotatable shaft, a second power input port coupled to the second rotatable shaft, a third power input port, and a power output port connected to at least one output shaft, wherein the rotational speed of the at least one output shaft is lower than the rotational speed of each of the first rotatable shaft and the second rotatable shaft, and
    a third spool having a third turbine connected to a third compressor through a third rotatable shaft,
    wherein the third rotatable shaft of the third spool is connected to the third power input port of the first gearbox.

2. The gas turbine engine of claim 1, wherein the rotational speed of the third turbine is independent from the first turbine and the second turbine.

3. The gas turbine engine of claim 1, wherein the power output port of the first gearbox is connected to at least one of a ducted fan, an unducted fan, a propeller and an electric generator.

4. A multi-shaft gas turbine engine comprising:
    a first gearbox having a plurality of power input ports and a power output port;
    a plurality of input shafts each coupled to a corresponding one of the plurality of power input ports;
    an output shaft coupled to the power output port of the first gearbox;
    a separate turbine and a separate compressor connected to at least one of the plurality of input shafts, each of the plurality of input shafts operable at different rotational speeds relative to one another; and
    a power device coupled to the output shaft of the first gearbox,
    wherein the plurality of input shafts include three shafts each independently connected to three separate turbines and to three separate input ports of the plurality of power input ports, respectively.

5. The multi-shaft gas turbine engine of claim 4, wherein the power output port is connected to at least one of a ducted fan, an unducted fan, a propeller and an electric power generator.

6. A power generating system comprising:
    a gas turbine engine having a fluid flowpath and at least three independent turbomachinery spools;
    an independent turbine driving an independent compressor on at least one of the independent turbomachinery spools, wherein each compressor compresses fluid in the flowpath;
    a first gearbox having at least three power input ports and each of the at least three power input ports coupled to the at least three independent turbomachinery spools, respectively and a power output port coupled to a power output shaft.

7. The power generating system of claim 6, wherein the power output shaft of the first gearbox is connected to at least one of a ducted fan, an unducted fan, a propeller and an electric power generator.

* * * * *